US009717132B2

(12) United States Patent
Sun et al.

(10) Patent No.: US 9,717,132 B2
(45) Date of Patent: Jul. 25, 2017

(54) INTELLIGENT LIGHTING CONTROL SYSTEM AND METHOD

(71) Applicant: SENGLED OPTOELECTRONICS CO., LTD., Tongxiang (CN)

(72) Inventors: Chaoqun Sun, Tongxiang (CN); Jinxiang Shen, Tongxiang (CN)

(73) Assignee: SENGLED OPTOELECTRONICS CO., LTD, Tongxiang (CN)

( * ) Notice: Subject to any disclaimer, the term of this patent is extended or adjusted under 35 U.S.C. 154(b) by 0 days.

(21) Appl. No.: 15/027,474

(22) PCT Filed: Sep. 17, 2015

(86) PCT No.: PCT/CN2015/089885
§ 371 (c)(1),
(2) Date: Apr. 6, 2016

(87) PCT Pub. No.: WO2016/074533
PCT Pub. Date: May 19, 2016

(65) Prior Publication Data
US 2016/0323977 A1    Nov. 3, 2016

(30) Foreign Application Priority Data

Nov. 14, 2014  (CN) .......................... 2014 1 0648007

(51) Int. Cl.
H05B 37/02        (2006.01)
H04L 12/28        (2006.01)
(Continued)

(52) U.S. Cl.
CPC ..... *H05B 37/0272* (2013.01); *H04L 12/2816* (2013.01); *H04W 4/008* (2013.01);
(Continued)

(58) Field of Classification Search
CPC .............. H05B 37/0272; H05B 37/034; H04L 12/2816
See application file for complete search history.

(56) References Cited

U.S. PATENT DOCUMENTS

2013/0320861 A1* 12/2013 Sinai ...................... H05B 37/02
                                                              315/152
2014/0118120 A1*  5/2014 Chen ...................... G08C 17/02
                                                              340/12.5
(Continued)

FOREIGN PATENT DOCUMENTS

CN    202735830 U    2/2013
CN    103809548 A    5/2014
(Continued)

OTHER PUBLICATIONS

The World Intellectual Property Organization (WIPO) International Search Report for PCT/CN2015/089885 Dec. 21, 2015.

*Primary Examiner* — Jason M Crawford
(74) *Attorney, Agent, or Firm* — Anova Law Group, PLLC

(57) ABSTRACT

An intelligent lighting control system is provided. The system includes at least one smart lighting device, including a control module, a lighting module, a microphone module and a wireless communication module, where the control module is connected to the lighting module, the microphone module, and the wireless communication module, respectively; the microphone module is configured to receive a voice instruction from a user and send the voice instruction to the control module; and the control module is configured to convert the voice instruction to a voice data signal. The system also includes a cloud server configured to perform voice recognition analysis on the voice data signal, convert the voice data signal to a control signal, and send the control signal to at least one smart home device. Further, the system includes the at least one smart home device configured to receive the control signal and perform a corresponding function.

20 Claims, 5 Drawing Sheets

(51) Int. Cl.
*H04W 4/00* (2009.01)
*H05B 33/08* (2006.01)
*H04W 84/12* (2009.01)

(52) U.S. Cl.
CPC ..... *H05B 33/0854* (2013.01); *H05B 37/0227* (2013.01); *H05B 37/0236* (2013.01); *H04W 84/12* (2013.01); *Y02B 20/48* (2013.01)

(56) References Cited

U.S. PATENT DOCUMENTS

| | | | | |
|---|---|---|---|---|
| 2014/0285113 | A1* | 9/2014 | Huang | H05B 37/0272 |
| | | | | 315/297 |
| 2014/0354160 | A1* | 12/2014 | Aggarwal | H05B 37/0227 |
| | | | | 315/152 |
| 2015/0043426 | A1* | 2/2015 | Aggarwal | H04L 12/2803 |
| | | | | 370/328 |
| 2015/0130355 | A1* | 5/2015 | Rains, Jr. | H05B 37/0227 |
| | | | | 315/134 |
| 2015/0312394 | A1* | 10/2015 | Mirza | H04M 1/7253 |
| | | | | 455/420 |

FOREIGN PATENT DOCUMENTS

| | | |
|---|---|---|
| CN | 104020733 A | 9/2014 |
| CN | 104378886 A | 2/2015 |
| CN | 204231709 U | 3/2015 |
| EP | 2506686 A2 | 10/2012 |

\* cited by examiner

INTELLIGENT LIGHTING CONTROL SYSTEM AND METHOD

CROSS-REFERENCES TO RELATED APPLICATIONS

This application is a national stage application under 35 USC §371(c) of PCT Application No. PCT/CN2015/089885, entitled "Intelligent Lighting Control System And Method" filed on Sep. 17, 2015, which claims priority to Chinese Patent Application No. 201410648007.4, filed on Nov. 14, 2014. The entire disclosure and contents of the above applications are hereby incorporated by reference herein.

FIELD OF THE INVENTION

The present disclosure generally relates to the intelligent lighting technology and smart home control field and, more particularly, relates to intelligent lighting control systems and methods.

BACKGROUND

Wireless technology has been applied to various electronic products and has freed people from cumbersome cablings and assemblies. Products with wireless technologies are now commonly used. Light emitting diode (LED) lighting may generally provide advantages in energy conservation, environmental protection, controllable lighting, solid state lighting, and long operational lifetime. LED lamps thus have been widely used in various areas for public, commercial, and/or indoor lighting for a low carbon life.

Currently, a smart home control system may include a smart home control device managing a network of devices and appliances. Such smart home control device often includes a residential gateway connected to an external network. The residential gateway is connected to one or more of a home central controller, an audio or video acquisition controller, an intelligent access controller, a lighting controller, a home appliance controller, home environmental sensors, a home alarm, an actuator and a network connector through a wired or wireless network. By configuring a variety of sensors, controllers, actuators and recognition devices related to home environment and home appliances, and by physical connections of wired or wireless network, automated control and real-time manual control of household goods can be realized.

However, various controllers and sensors in the current smart home control system require separate wiring. The installation is complex and the cost is high. Additionally, remote wireless control cannot be realized by using the smart lighting device. The disclosed intelligent lighting control systems and methods are directed to solve one or more problems set forth above and other problems.

BRIEF SUMMARY OF THE DISCLOSURE

One aspect of the present disclosure includes an intelligent lighting control system. The system includes at least one smart lighting device; a cloud server; and at least one smart home device. The at least one smart lighting device includes a control module, a lighting module, a microphone module and a wireless communication module. The control module is connected to the lighting module, the microphone module, and the wireless communication module, respectively, the microphone module is configured to receive a voice instruction from a user and send the received voice instruction to the control module, and the control module is configured to convert the voice instruction to a voice data signal and send the voice data signal to a cloud server through the wireless communication module. The system also includes the cloud server configured to perform voice recognition analysis on the received voice data signal, convert the voice data signal to a control signal, and send the control signal to the at least one smart home device. Further, the system includes the at least one smart home device configured to receive the control signal and perform a corresponding function, where the wireless communication unit in the at least one smart home device is configured to connect the at least one smart home device to the cloud server.

Another aspect of the present disclosure includes another intelligent lighting control system. The system includes at least one smart lighting device; a cloud server; a gateway controller; and at least one smart home device. The at least one smart lighting device includes a control module, a lighting module, a microphone module and a wireless communication module. The control module is connected to the lighting module, the microphone module, and the wireless communication module, respectively, the microphone module is configured to receive a voice instruction from a user and send the received voice instruction to the control module, the control module is configured to convert the voice instruction to a voice data signal and send the voice data signal to a cloud server through the wireless communication module, and the wireless communication module is configured to connect the smart lighting device to the cloud server. The system also includes the cloud server configured to perform voice recognition analysis on the received voice data signal, convert the voice data signal to a control signal, and send the control signal to the gateway controller in a same network. Further, the system includes the gateway controller configured to receive the control signal from the cloud server and transmit the control signal to at least one smart home device and at least one smart home device, including a wireless communication unit, configured to receive the control signal and perform a corresponding function, where the wireless communication unit in the at least one smart home device is configured to connect the at least one smart home device to the gateway controller.

Another aspect of the present disclosure includes an intelligent lighting control method. The method includes at least one smart lighting device receiving a voice instruction from a user. The method also includes the at least one smart lighting device converting the voice instruction to a voice data signal. Further, the method includes the at least one smart lighting device sending the voice data signal to a cloud server through the Internet.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
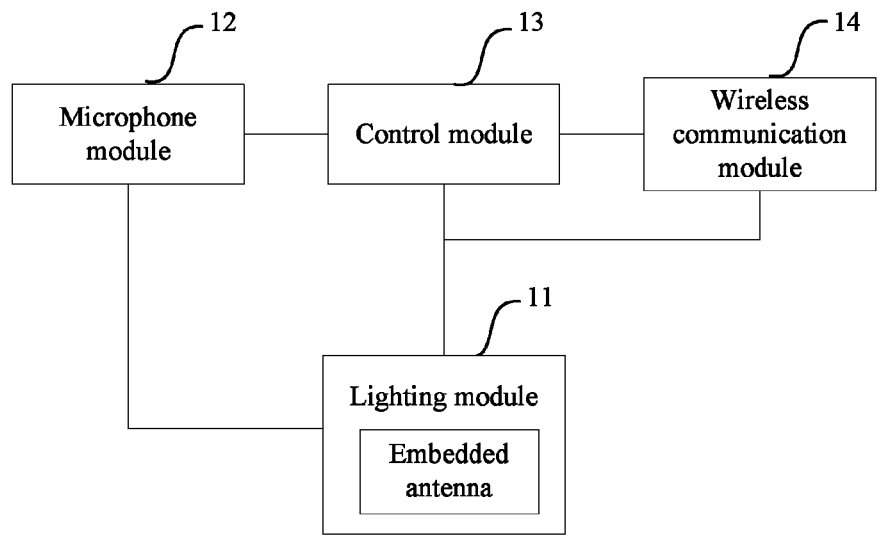
FIG. 1 illustrates a frame diagram of an exemplary smart lighting device consistent with the disclosed embodiments.

FIG. 1 illustrates a frame diagram of an exemplary smart lighting device consistent with the disclosed embodiments. As shown in FIG. 1, the smart lighting device 1 may include a lighting module 11, a microphone module 12, a control module 13, and a wireless communication module 14. Certain devices may be omitted and other devices may be included.

The microphone module 12 may be configured to capture a voice instruction from ambient voices/sounds from, e.g., a user, a device, a machine, etc. The microphone module 12 may send the voice instruction to the control module 13.

The control module 13 may be configured to convert the voice instruction to a voice data signal, and send out the voice data signal through the wireless communication module 14, for example, to further control lighting of the lighting module 11 and/or to control operations of desired smart home appliance(s). The control module 13 may include a digital signal processor, a microcontroller, or a digital IC (i.e., integrated circuit) controller, and/or a combination thereof.

In one embodiment, the control module 13 can generate a PWM (pulse-width module) signal for controlling lighting (e.g., dimming) of the lighting module 11. The control module 13 can be directly connected to the lighting module 11. The control module 13 can set and output PWM signal. The PWM signal can be set with a fixed constant frequency, an adjustable or a constant duty cycle, and an adjustable frequency with a fixed duty cycle.

The wireless communication module 14 may use 2.4G or 5G Wi-Fi technology. The wireless communication module 14 may also use 2.5G, 3G, or 4G mobile wireless communication technology.

In various embodiments, the lighting module 11 is an LED lighting module. The lighting module 11, the microphone module 12, the control module 13, and/or the wireless communication module 14 may be integrated into a lamp body of an LED lamp to form a single device.

In various embodiments, the lighting module 11 includes a one or more LED lighting devices. One or more of the LED lighting devices may provide indicator lighting to reflect the status of the smart lighting device. If the intelligent light device is operating normally, for example, the indicator lighting may be a green light. If the intelligent light device is operating with problems, for example, the indicator lighting may be an orange light. One or more of the LED lighting devices may provide general lighting for the areas covered by the smart lighting device. In some embodiments, the lighting module 11 may turn on/off the indicator lighting, the general lighting, or a combination thereof, according to the set-up of the system.

In one embodiment, the microphone module 12 may be integrated with driver circuit of the lighting module 11 to save space and to reduce wire loss on of a distributed design. Optionally, an embedded antenna can be integrated into the LED lamp. The embedded antenna may be configured to accommodate shape of the lamp body of the LED lamp without increasing size of the resultant device and to maintain original design of the LED lamp. Further, the wireless communication module 14 may be configured with automatic frequency hopping functions to avoid interference with other radio devices. Furthermore, noise reduction and/or echo cancellation technologies can be applied using software and hardware products to provide the LED lamp with desired audio effects.

Figure 2:
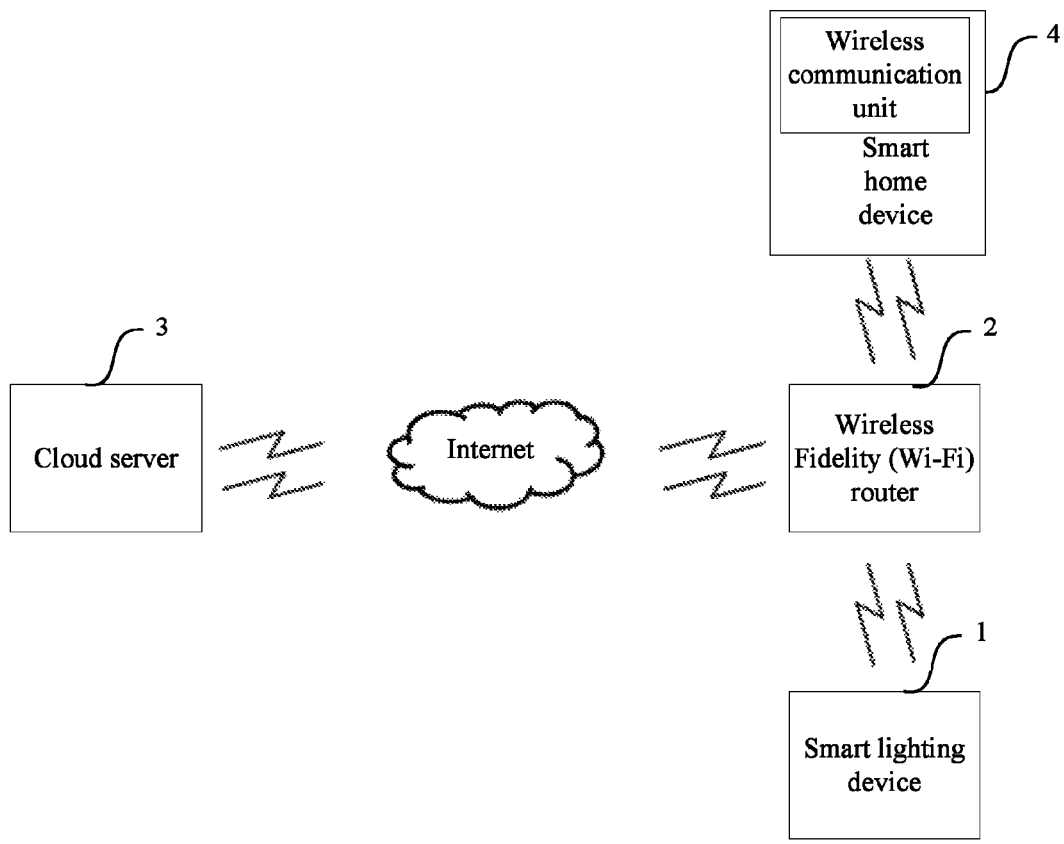
FIG. 2 illustrates a schematic of an exemplary intelligent lighting control system consistent with the disclosed embodiments.

FIG. 2 illustrates a schematic of an exemplary intelligent lighting control system consistent with the disclosed embodiments. As shown in FIG. 2, the intelligent lighting control system may include at least one smart lighting device 1, a Wi-Fi router 2, a cloud server 3, and at least one smart home device 4. The smart home device 4 also includes a wireless communication unit (not shown in FIG. 2).

In various embodiments, the smart lighting device 1 may be the device shown in FIG. 1. The smart lighting device 1 may be connected to the Wi-Fi router 2 through the wireless communication module 14 of the smart lighting device 1 shown in FIG. 1. The Wi-Fi router 2 is connected to the cloud server 3 through the Internet or any network. The smart home device 4 is connected to the cloud server 3 through the wireless communication unit and the Wi-Fi router 2.

For example, the microphone module 12 in the smart lighting device 1 receives a voice instruction from a user and sends the received voice instruction to the control module 13. The control module 13 converts the voice instruction to a voice data signal and sends the voice data signal to the cloud server 3 through the wireless communication module 14. A voice recognition module (not shown) configured in the cloud server 3 performs voice recognition analysis for the voice data signal sent from the smart lighting device 1 and converts the voice data signal to a control signal. The cloud server 3 sends the control signal to the at least one smart home device 4, thus controlling the state of the at least one smart home device 4.

Figure 3:
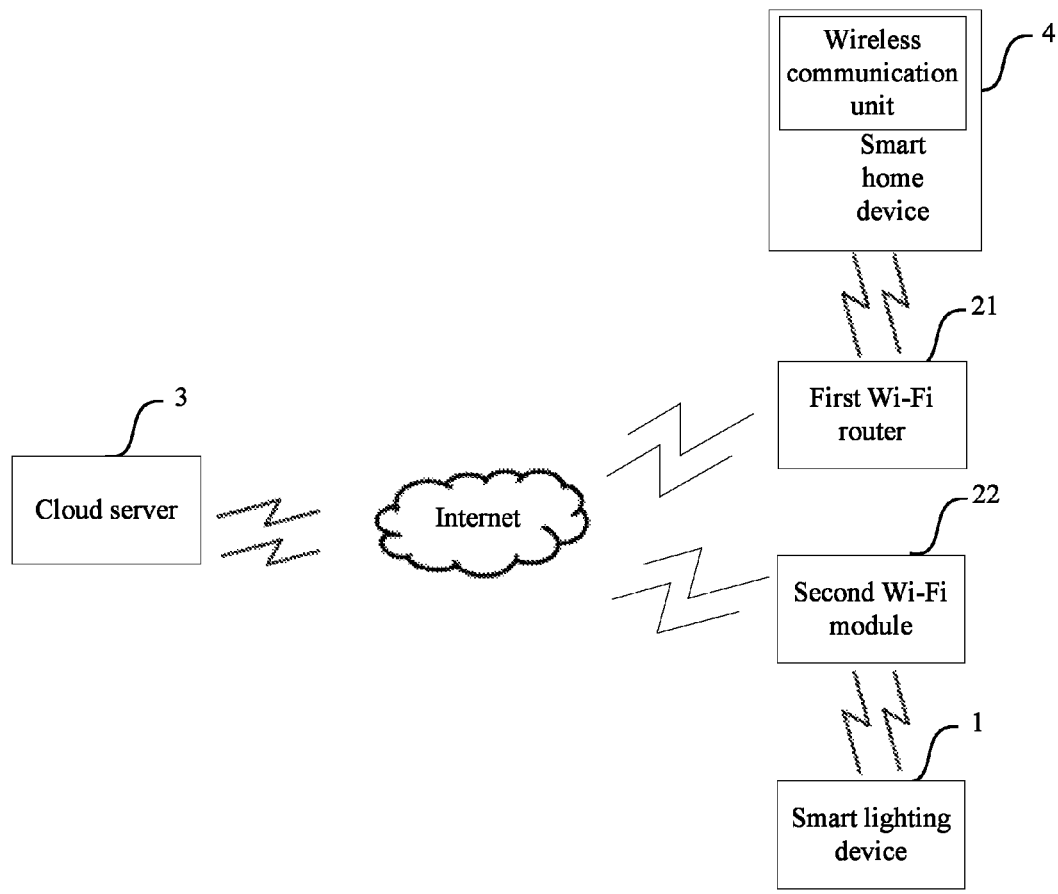
FIG. 3 illustrates a schematic of another exemplary intelligent lighting control system consistent with the disclosed embodiments.

FIG. 3 illustrates a structure schematic diagram of another exemplary intelligent lighting control system consistent with the disclosed embodiments. As shown in FIG. 3, the Wi-Fi router 2 includes a first Wi-Fi router 21 and a second Wi-Fi router 22. The at least one smart home device 4 is connected to the cloud server 3 through the first Wi-Fi router 21. The at least one smart lighting device 1 is connected to the cloud server 3 through the second Wi-Fi router 22.

For example, both the first Wi-Fi router 21 and second Wi-Fi router 22 are connected to the cloud server 3 through the Internet. The microphone module 12 in the smart lighting device 1 receives a voice instruction from a user and sends the received voice instruction to the control module 13. The control module 13 converts the voice instruction to a voice data signal and sends the voice data signal to the cloud server 3 through the wireless communication module 14. A voice recognition module configured in the cloud server 3 performs voice recognition analysis for the voice data signal sent from the smart lighting device 1 and converts the voice data signal to a control signal. The cloud server 3 sends the control signal to the at least one smart home device 4, thus controlling the state of the at least one smart home device 4.

The first Wi-Fi router 21 and second Wi-Fi router 22 may be located in different places. Thus, the smart lighting device 1 can remote control the at least one smart home device 4.

In some embodiments, the smart lighting device 1 can remote control the smart home device 4 and reflect the status of the smart home device 4 by changing the lighting output of the smart lighting device 1. For example, the use may send a voice command to turn on smart home device 4 through smart lighting device 1. Through the wireless routers 21 and 22, smart lighting device 1 may send the control signals to smart home device 4. Once the smart home device 4 is turned on, it may send a feedback signal back to smart lighting device 1 indicating that device 4 is powered on. The smart lighting device 1 may show the status of device 4 by turning on an indicator light and/or varying the lighting color or brightness level of the provided light.

In one example, the smart lighting device 1 may include a plurality of indicator lights (e.g., LED lights) corresponding to the smart home devices 4, routers 21 and 22, other components of the system home system. The smart lighting device 1 may include one or more lighting units to provide general lighting for the surrounding environment. The smart lighting device 1 may also include one or more sensors, such as motion sensors or light intensity sensors. In one example, when a user approaches the smart lighting device 1, the smart lighting device 1 may turn on the general lighting unit(s) for the user. The user may then check the indicator lights to make sure the smart home devices 4 are performing desired operations, the wireless routers 21 and 22 are connected to the internet, the smart lighting device 1 is connected to the routers 21 and 22, and or the cloud server 3, etc.

In some embodiments, the smart lighting device 1 may also include a display module, which may be a part of the smart lighting device 1 or attached to the smart lighting device 1. The display module may include a display panel such as an LED panel, an OLED panel, etc. The display module may display the operational status of the smart home devices 4. The display module may display the data collected from the sensors, such as light intensity levels. The display may be turned on or off depending on the input of the motions sensor. That is, when a user walks into the range of the smart lighting device 1, the smart lighting device 1 may turn on the display module as well as the general lighting unit(s) for the user. In one embodiment, when the user gives a voice command, the smart lighting device 1 may then receive the recognized voice command from server 3 and display the recognized command on the display module.

Figure 4:
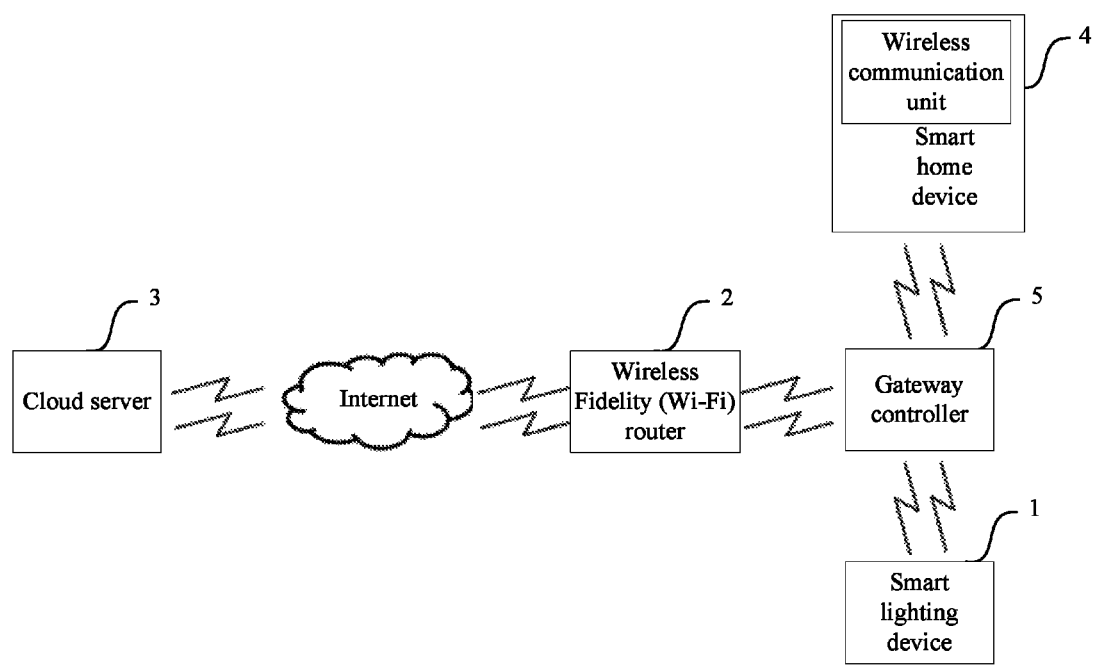
FIG. 4 illustrates a schematic of another exemplary intelligent lighting control system consistent with the disclosed embodiments.

FIG. 4 illustrates a structure schematic diagram of another exemplary intelligent lighting control system consistent with the disclosed embodiments. Because there may have many kinds of smart home devices and each smart home device has its own characteristics and vendor specific standard control module, if there is not a gateway for coordinating the services, it may cause communication confusion. Therefore, the intelligent lighting control system may also include a gateway controller 5.

As shown in FIG. 4, the gateway controller 5 is connected to the cloud server 3 through the Wi-Fi router 2. The Wi-Fi router 2 is connected to the cloud server 3 through the Internet. The smart home device 4 and the smart lighting device 1 may be connected to the gateway controller 5 through the Wi-Fi technology. The smart home device 4 and the smart lighting device 1 may also be connected to the gateway controller 5 through one of Bluetooth technology, Zigbee technology and other wireless communication technologies. When the smart home device 4 and the smart lighting device 1 are connected to the gateway controller 5 through non-Wi-Fi technologies, the gateway controller 5 needs to include a conversion module, where the conversion module may be configured to convert a Bluetooth signal, a Zigbee signal or other wireless communication signals to the Wi-Fi signal. The gateway controller 5 coordinates different voice instructions, thus ensuring normal communication with the corresponding smart home devices and performing error correction for common error signals.

In one embodiment, the microphone module 12 in the smart lighting device 1 receives a voice instruction from a user and sends the voice instruction to the control module 13. The control module 13 converts the voice instruction to a voice data signal and sends the voice data signal to the cloud server 3 through the wireless communication module 14. A voice recognition module configured in the cloud server 3 performs voice recognition analysis for the voice data signal sent from the smart lighting device 1 and converts the voice data signal to a control signal. The cloud server 3 sends the control signal to the gateway controller 5. The gateway controller 5 sends the control signal to the at least one smart home device 4, thus controlling the state of the at least one smart home device 4.

Of course, the voice instruction received by the smart lighting device 1 may be sent to the cloud server 3 through the gateway controller 5. In various embodiments, the gateway controller may be provided by using any suitable devices, such as, for example, a smart phone, a computer, etc., to check status and to remotely control the smart home device(s).

The smart home devices 4 may refer to white goods, brown goods or other smart devices. The white goods refer to major appliances used for routine housekeeping tasks such as cooking, laundry washing, or food preservation. The white goods may include air conditioners, refrigerators, stoves, etc. The brown goods refer to consumer electronics intended for everyday use, most often in entertainment, communications and office productivity. The brown goods may include personal computers (PCs), telephones, Moving Picture Experts Group Audio Layer III (MP3) players, televisions, digital cameras and players and recorders using video media such as DVDs, VCRs or camcorders.

Further, the cloud server 3 may refer to one or more server computers configured to provide certain services. The cloud server 3 may include one or more processors to execute computer programs in parallel.

Figure 5:
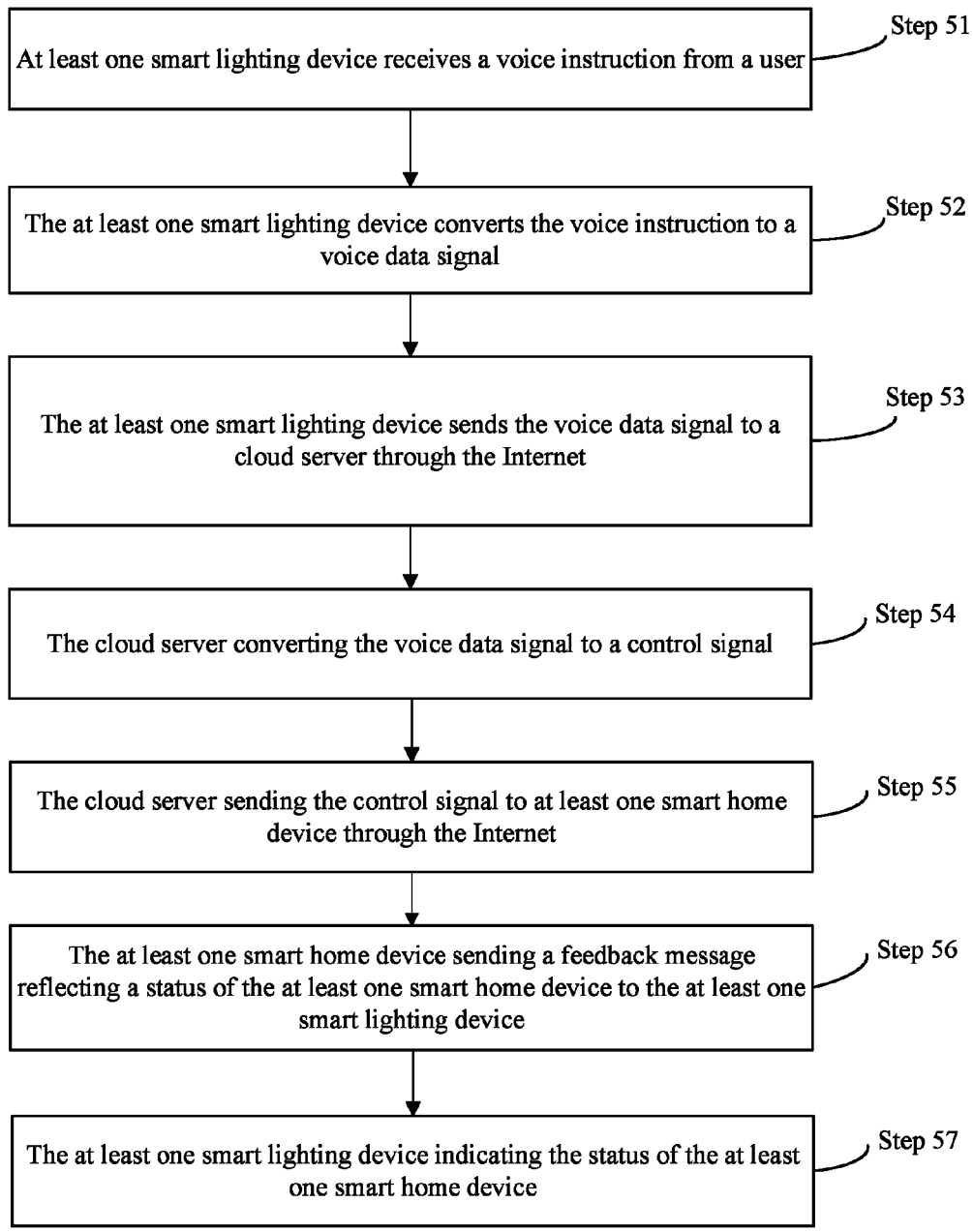
FIG. 5 illustrates a flow chart of an exemplary process for intelligent lighting control consistent with the disclosed embodiments.

FIG. 5 illustrates a flow chart of an exemplary process for intelligent lighting control consistent with the disclosed embodiments. The process is described from the side including at least one smart lighting device.

In Step 51: at least one smart lighting device receives a voice instruction from a user. When the user speaks and gives voice instruction, the smart lighting device may receive the voice instruction from the user via a microphone.

In Step 52: the at least one smart lighting device converts the voice instruction to a voice data signal.

In Step 53: the at least one smart lighting device sends the voice data signal to a cloud server through the Internet.

For example, the smart lighting device may include a lighting module, a microphone module, a control module and a wireless communication module. The microphone module in the smart lighting device receives a voice instruction from a user and sends the received voice instruction to the control module. The control module converts the voice instruction to a voice data signal and sends the voice data signal to the cloud server through the wireless communication module.

Figure 6:
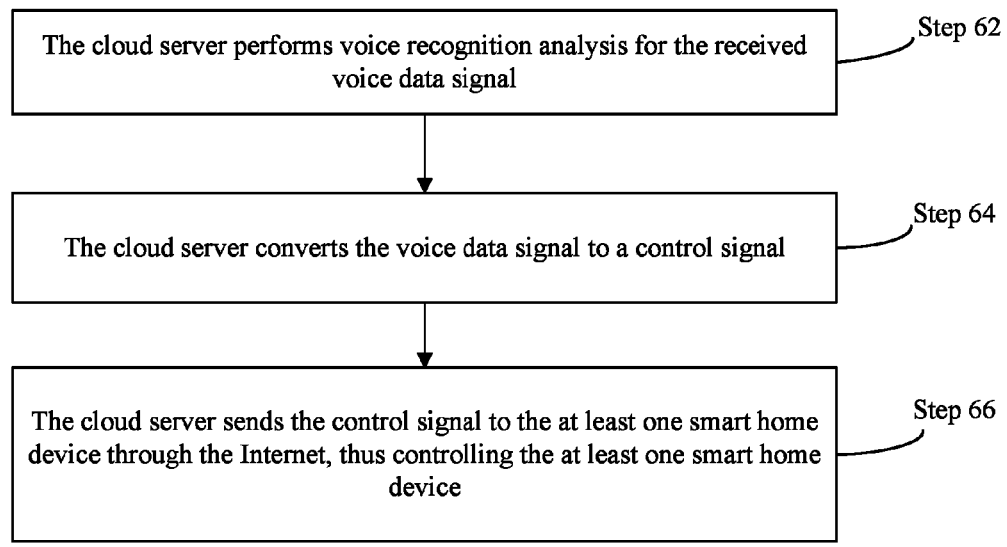
FIG. 6 illustrates a flow chart of another exemplary process for intelligent lighting control consistent with the disclosed embodiments.

FIG. 6 illustrates a flow chart of another exemplary process for intelligent lighting control consistent with the disclosed embodiments. The process is described from a cloud server side.

In Step 62: a cloud server performs voice recognition analysis on the received voice data signal.

After the cloud server receives a voice data signal sent from at least one smart lighting device, the cloud server performs voice recognition analysis on the received voice data signal.

In Step 64: the cloud server converts the voice data signal to a control signal.

In Step 66: the cloud server sends the control signal to the at least one smart home device through the Internet, thus controlling the at least one smart home device.

For example, the at least one smart home device and the at least one smart lighting device are connected to the cloud server through a Wi-Fi router. In some cases, the Wi-Fi router includes a first Wi-Fi router and a second Wi-Fi router. The at least one smart home device is connected to the cloud server through the first Wi-Fi router. The at least one smart lighting device is connected to the cloud server through the second Wi-Fi router. The at least one smart home device and the at least one smart lighting device are connected to the cloud server through one of 2.5G, 3G and 4G mobile wireless communication technology, for example.

In another example, the smart home device and the smart lighting device may be connected to a gateway controller. The gateway controller is connected to the cloud server through the Wi-Fi router. Thus, the cloud server can send the control signal to the at least one smart home device through the Wi-Fi router and the gateway controller. Also, the at least one smart lighting device can send the voice data signal to the cloud server through the gateway controller and the Wi-Fi router. The gateway controller coordinates different voice instructions, thus ensuring desired communication with the corresponding smart home devices and performing error correction for common error signals.

In this manner, the operation of the one or more smart home devices can thus be controlled according to the control signal from the cloud server. Such one or more smart home devices may include substantially all smart home appliances that are related or connected to the cloud server, or include those selected from all of the smart home devices selected according to the control signal.

The at least one smart lighting device 1, the cloud server 3, and the at least one smart home device 4 may communicate with one another, e.g., via internet or any suitable network. In some embodiment, the cloud server may be configured to read status of the smart home device(s) and to locally and/or remotely control operational status of the smart home device(s). The cloud server can recognize and process the control signal and send the control signal to selected or all smart home device(s) for controlling operations thereof.

In an exemplary embodiment, the at least one smart lighting device 1 and the at least one smart home device 4 may be configured in a fixed location, e.g., within a same room or different rooms of a building or a house. In one embodiment, the at least one smart lighting device 1 can be configured remotely from the at least one smart home device to check and/or control their operations.

In some embodiments, multiple smart lighting devices 1 may be used to accommodate various user needs. For example, different users may individually send a voice command to different smart lighting devices to control lighting of each smart lighting device and to control operations of the same or different smart home device(s), simultaneously or sequentially. In some cases, a same smart lighting device may be used to control the same or different smart home device(s) at different times. In other cases, different smart lighting devices may be used to control the same smart home device(s) at different times.

In various embodiments, the cloud server can be replaced by a smart terminal device, e.g., a smart phone. For example, while the cloud server can provide cloud voice recognition, the smart terminal device can provide local voice recognition. An exemplary intelligent control system may thus include at least one smart lighting device, a smart terminal device, and/or at least one smart home device. In one embodiment, the smart terminal device can at least include a voice recognition module and/or one or more processors.

In an exemplary embodiment, voice instructions/commands may be directly sent to the smart lighting device by a user. The microphone module in the smart lighting device can capture voice instructions, which can then be processed by the control module to provide voice signal. The voice signal can be sent to the smart terminal device via the wireless communication module in the smart lighting device. User's voice instructions may be recognized and further processed by the voice recognition module and the processor in the smart terminal device. The resultant control signal can then be sent from the smart terminal device to one or more smart home devices that can communicate with the smart terminal device. Thus, the disclosed smart lighting device can be used in a control system to control operations of smart home devices via the smart terminal device.

In another embodiment, when a user sends voice instructions to the smart lighting device, the smart lighting device captures and processes the voice instructions to provide voice data signal, which are then sent to the at least one of a smart terminal device and a cloud server. The smart terminal device or cloud server can recognize and process the voice data signal to provide control signal. The control signal can be sent to a corresponding smart home device connected to the smart terminal device or cloud server to control an operation of the smart home device.

In various embodiments, controlling of the smart home devices may include, e.g., switching on/off one or more household electrical appliances, and/or changing parameters of one or more household electrical appliances (e.g., setting/altering a temperature for refrigerator or air conditioner, setting/altering a time for starting a dishwasher, etc.).

The steps of a method described in connection with the embodiments disclosed herein may be embodied directly in hardware, in a software module executed by a processor, or in a combination of the two. For example, various modules of this disclosure may be implemented through Application Specific Integrated Circuit (ASIC) or any other similar hardware devices. The software programs (including related data structures) of this disclosure may be stored in readable recording medium, such as RAM memory, flash memory, ROM memory, EPROM memory, EEPROM memory, registers, hard disk, a removable disk, a CD-ROM, or any other form of storage medium known in the art. The processor and the storage medium may reside in an ASIC. The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

As disclosed herein, in one embodiment, at least one smart lighting device receives a voice instruction from a user, converts the voice instruction to a voice data signal and sends the voice data signal to a cloud server through the Internet. Further, the cloud server performs voice recognition analysis for the received voice data signal. The cloud server converts the voice data signal to a control signal. Moreover, the cloud server sends the control signal to the at least one smart home device through the Internet, thus controlling the at least one smart home device. Thus, the intelligent lighting control method can satisfy the requirements of users, decrease the energy consumption, and reduce the manufacturing cost.

What is claimed is:

1. An intelligent lighting control system, comprising:
   at least one smart lighting device;
   a cloud server; and
   at least one smart home device,
   the at least one smart lighting device for communicating and controlling the at least one smart home device, including: a control module, a lighting module, a microphone module and a wireless communication module, wherein:
      the control module is connected to the lighting module, the microphone module, and the wireless communication module, respectively,
      the microphone module is configured to receive a voice instruction from a user and send received voice instruction to the control module,
      the control module is configured to convert the received voice instruction to a voice data signal and send the voice data signal to the cloud server through the wireless communication module, and
      the wireless communication module is configured to connect the at least one smart lighting device to the cloud server;
   the cloud server performing voice recognition analysis on the received voice data signal, converting the voice data signal to a control signal, and sending the control signal to the at least one smart home device; and
   the at least one smart home device including a wireless communication unit, receiving the control signal, performing a corresponding function, and sending a feedback message reflecting a status of the at least one smart home device to the at least one smart lighting device such that the at least one smart lighting device indicates the status of the at least one smart home device, wherein the wireless communication unit in the at least one smart home device is configured to connect the at least one smart home device to the cloud server.

2. The system according to claim 1, further including:
a Wireless-Fidelity (Wi-Fi) router, wherein the at least one smart home device and the at least one smart lighting device are connected to the cloud server through the Wi-Fi router.

3. The system according to claim 2, wherein:
the Wi-Fi router further includes a first Wi-Fi router and a second Wi-Fi router;
the at least one smart home device is connected to the cloud server through the first Wi-Fi router; and
the at least one smart lighting device is connected to the cloud server through the second Wi-Fi router.

4. The system according to claim 1, wherein:
the at least one smart home device and the at least one smart lighting device are connected to the cloud server through one of 2.5G, 3G and 4G mobile wireless communication technology.

5. The system according to claim 4, wherein:
the smart lighting device includes a light emitting diode (LED) lamp.

6. The system according to claim 4, wherein:
the smart lighting device also includes an embedded antenna.

7. An intelligent lighting control system, comprising:
   at least one smart lighting device;
   a cloud server;
   a gateway controller; and
   at least one smart home device,
   the at least one smart lighting device for communicating and controlling the at least one smart home device, including: a control module, a lighting module, a microphone module and a wireless communication module, wherein:
      the control module is connected to the lighting module, the microphone module, and the wireless communication module, respectively,
      the microphone module is configured to receive a voice instruction from a user and send the received voice instruction to the control module,
      the control module is configured to convert the voice instruction to a voice data signal and send the voice data signal to the cloud server through the wireless communication module, and
      the wireless communication module is configured to connect the at least one smart lighting device to the cloud server;
   the cloud server performing voice recognition analysis on the received voice data signal, converting the voice data signal to a control signal, and send the control signal to the gateway controller;
   the gateway controller receiving the control signal from the cloud server and transmitting and coordinating the control signal to the at least one smart home device and to the at least one smart lighting device such that the at least one smart lighting device controls the at least one smart home device; and
   the at least one smart home device including a wireless communication unit, receiving the control signal and performing a corresponding function, wherein the wireless communication unit in the at least one smart home device is configured to connect the at least one smart home device to the gateway controller.

8. The system according to claim 7, further including:
a Wireless-Fidelity (Wi-Fi) router, wherein the gateway controller is connected to the cloud server through the Wi-Fi router.

9. The system according to claim 7, wherein:
the at least one smart home device and the at least one smart lighting device are connected to the gateway controller through Wi-Fi technology;
the at least one smart lighting device sends the voice data signal to the gateway controller through the wireless communication module; and
the gateway controller transmits the voice data signal to the cloud server.

10. The system according to claim 7, wherein:
the at least one smart home device and the at least one smart lighting device are connected to the gateway controller through one of Bluetooth technology and Zigbee technology.

11. The system according to claim 10, wherein:
the gateway controller includes a conversion module, wherein the conversion module is configured to convert one of a Bluetooth signal and a Zigbee signal to a Wi-Fi signal.

12. The system according to claim 7, wherein:
the smart lighting device includes a light emitting diode (LED) lamp.

13. The system according to claim 7, wherein:
the smart lighting device also includes an embedded antenna.

14. An intelligent lighting control method, comprising:
receiving, by at least one smart lighting device, a voice instruction from a user;
converting, by the at least one smart lighting device, the voice instruction to a voice data signal;
sending, by the at least one smart lighting device, the voice data signal to a cloud server through an Internet;
converting, by the cloud server, the voice data signal to a control signal; and
sending, by the cloud server, the control signal to at least one smart home device through the Internet,
sending, by the at least one smart home device, a feedback message reflecting a status of the at least one smart home device to the at least one smart lighting device; and
indicating, by the at least one smart lighting device, the status of the at least one smart home device.

15. The method according to claim 14, further including:
performing, by the cloud server, voice recognition analysis on the received voice data signal;
converting, by the cloud server, the voice data signal to a control signal; and
sending, by the cloud server, the control signal to at least one smart home device through the Internet.

16. The method according to claim 15, wherein:
the Wi-Fi router further includes a first Wi-Fi router and a second Wi-Fi router;
the at least one smart home device is connected to the cloud server through the first Wi-Fi router; and
the at least one smart lighting device is connected to the cloud server through the second Wi-Fi router.

17. The method according to claim 14, wherein:
the at least one smart home device and the at least one smart lighting device are connected to the cloud server through a Wi-Fi router.

18. The method according to claim 14, wherein:
the at least one smart home device and the at least one smart lighting device are connected to the cloud server through one of 2.5G, 3G and 4G mobile wireless communication technology.

19. The method according to claim 14, wherein:
the at least one smart home device and the at least one smart lighting device are connected to a gateway controller through Wi-Fi technology; and
the gateway controller is connected to the cloud server through the Wi-Fi router.

20. The method according to claim 19, wherein:
the at least one smart home device and the at least one smart lighting device are connected to the gateway controller through one of Bluetooth technology and Zigbee technology; and
the gateway controller includes a conversion module, wherein the conversion module is configured to convert one of a Bluetooth signal and a Zigbee signal to a Wi-Fi signal.

* * * * *